(12) United States Patent  (10) Patent No.: US 8,170,530 B2
Brink, Jr. et al.  (45) Date of Patent: May 1, 2012

(54) MANAGING WIRELESS DEVICES USING ACCESS CONTROL

(75) Inventors: Kenneth A. Brink, Jr., Highlands Ranch, CO (US); Randy S. Johnson, Ofallon, MO (US); Raymond T. Malkowski, Round Rock, TX (US); Jeffrey H. Martin, Canton, GA (US); Tedrick N. Northway, Wood River, IL (US); Patrick J. Richards, Jr., Marietta, GA (US); Duane L. Winkler, Shawnee, KS (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 11/734,034

(22) Filed: Apr. 11, 2007

(65) Prior Publication Data

US 2008/0254786 A1    Oct. 16, 2008

(51) Int. Cl.
    *H04M 1/66*    (2006.01)
(52) U.S. Cl. ...................................................... 455/411
(58) Field of Classification Search .......... 455/410–411, 455/456.1–456.6
    See application file for complete search history.

(56) References Cited

U.S. PATENT DOCUMENTS

| | | | |
|---|---|---|---|
| 6,256,515 B1 | 7/2001 | Cox et al. | |
| 6,308,053 B1 | 10/2001 | Nilsson | |
| 6,308,067 B1 | 10/2001 | Morgan | |
| 6,370,402 B1 * | 4/2002 | Hakomori | 455/550.1 |
| 6,687,496 B1 | 2/2004 | Nangle | |
| 6,847,970 B2 | 1/2005 | Keller et al. | |
| 6,920,319 B2 | 7/2005 | Knutsson et al. | |
| 7,010,002 B2 | 3/2006 | Chow et al. | |
| 7,106,845 B1 * | 9/2006 | Zhuk et al. | 379/207.11 |
| 2002/0081995 A1 | 6/2002 | Leppinen et al. | |
| 2002/0154751 A1 | 10/2002 | Thompson, III et al. | |
| 2003/0200308 A1 * | 10/2003 | Tameda et al. | 709/224 |
| 2004/0063463 A1 | 4/2004 | Boivin | |
| 2005/0041648 A1 | 2/2005 | Bharatia et al. | |
| 2005/0054324 A1 | 3/2005 | Chmaytelli et al. | |
| 2006/0022048 A1 * | 2/2006 | Johnson | 235/462.1 |
| 2006/0031399 A1 | 2/2006 | Sherman et al. | |
| 2006/0105740 A1 * | 5/2006 | Puranik | 455/410 |
| 2006/0286930 A1 * | 12/2006 | Rathus et al. | 455/26.1 |
| 2006/0293029 A1 * | 12/2006 | Jha et al. | 455/411 |
| 2007/0190995 A1 * | 8/2007 | Wang et al. | 455/419 |
| 2008/0293397 A1 * | 11/2008 | Gajdos et al. | 455/420 |

OTHER PUBLICATIONS

"Asset Tracking System for Networked or Networkable Assets". IBM Research Disclosure Article #456171, Apr. 2002, p. 692.

\* cited by examiner

*Primary Examiner* — Steven Lim
(74) *Attorney, Agent, or Firm* — Anna L. Linne; Hoffman Warnick LLC (57) ABSTRACT

An improved solution for managing wireless devices that uses access control is provided. In an embodiment of the invention, a method for managing wireless devices includes receiving a notification for one of the plurality of wireless devices, the notification indicating at least one of: an access attempt threshold is exceeded or the wireless device is displaced; and remotely locking the wireless device based on the notification.

18 Claims, 4 Drawing Sheets

MANAGING WIRELESS DEVICES USING ACCESS CONTROL

FIELD OF THE INVENTION

Aspects of the invention relate generally to managing wireless devices, and more particularly, to managing wireless devices using access control.

BACKGROUND OF THE INVENTION

Usage of wireless devices such as a mobile phone, a smartphone, a personal digital assistant (PDA), etc. has exploded in recent time. Although this tremendous increase in use has affected the individual owner, there are additional complications created for a group, organization, and/or company that are using wireless devices. As the types, number, and usage of wireless devices continues to increase, it becomes critical for a company to better manage aspects of the wireless devices, such as the number and/or types of wireless devices, as well as to accurately track charges, such as monthly utilization to actual cost. Companies also find a requirement to help ensure that costs/billing be applied to a particular division, department, and/or individual level. Other important issues include keeping and tracking available information on the asset(s), such as what manufacturer, model, and/or software is installed, and how the wireless device is configured. Wireless device users also require wireless device support, either live or self-help, for problem resolution. Software updates are another requirement, keeping the wireless device up-to-date with the latest fixes and/or enhancements.

An illustrative scenario is a corporation, XYZ Corp. (XYZ), which requires mobile phones and PDA devices for employees. As such, XYZ contracts both with a cellular service provider, CP1, and with CP2, a mobile phone and PDA device provider. Both CP1 and CP2 are to each provide services for corporate and personal employee usage of their respective wireless devices. This requires XYZ and/or the employees to contact each provider (i.e., CP1, CP2) for monthly usage, billing, support, etc. Certainly with any size company, but in particular with large companies, because of the vast quantities of wireless devices and the use thereof, and/or the globalization of a company, suitable and efficient management of the wireless devices has quickly become less attainable.

A consideration in managing wireless devices is security. Wireless devices are often misplaced, stolen, and/or lost. Especially in the case of a stolen wireless device, the thief may instantly obtain access to all information held in the wireless device (e.g., phone numbers, proprietary information, security codes, banking information, credit card information, trade secret information, personal information, etc.) as well as have unfettered access to the Internet, often aided by the ill gotten information immediately within the wireless device. Unfortunately, because wireless device technologies are constantly improving, the information (i.e., type and quantity) both within the wireless device and/or accessible from the wireless device also has increased profoundly. While this growth in technology certainly enhances the legitimate wireless device user's experience, in the wrong hands it can also only further aid the criminal with his/her activities. Security management of wireless devices becomes further complicated in the scenario where the corporation has a plurality (e.g., perhaps hundreds) of wireless device providers, coupled with a variety of wireless service providers, matched with a large number of employees (e.g., hundreds, thousands, etc.) all scattered around the globe. As a result, security has become an even larger concern in the arena of managing wireless devices.

In view of the foregoing, a need exists to overcome one or more of the deficiencies in the related art.

SUMMARY OF THE INVENTION

Aspects of the invention provide an improved solution for managing wireless devices that uses access control. In an embodiment of the invention, a method for managing wireless devices includes receiving a notification for one of the plurality of wireless devices, the notification indicating at least one of: an access attempt threshold is exceeded or the wireless device is displaced; and remotely locking the wireless device based on the notification.

A first aspect of the invention provides a computerized method of managing a plurality of wireless devices, the method comprising: receiving a notification for one of the plurality of wireless devices, the notification indicating at least one of: an access attempt threshold is exceeded or the wireless device is displaced; and remotely locking the wireless device based on the notification.

A second aspect of the invention provides a computerized system for managing a plurality of wireless devices, the method comprising: a system for receiving a notification for one of the plurality of wireless devices, the notification indicating at least one of: an access attempt threshold is exceeded or the wireless device is displaced; and a system for remotely locking the wireless device based on the notification.

A third aspect of the invention provides a computer program comprising program code stored on a computer-readable medium, which when executed, enables a computer system to implement a method of managing a plurality of wireless devices, the method comprising: receiving a notification for one of the plurality of wireless devices, the notification indicating at least one of: an access attempt threshold is exceeded or the wireless device is displaced; and remotely locking the wireless device based on the notification.

A fourth aspect of the invention provides a method of generating a system for managing a plurality of wireless devices, the method comprising: providing a computer system operable to: receive a notification for one of the plurality of wireless devices, the notification indicating at least one of: an access attempt threshold is exceeded or the wireless device is displaced; and remotely lock the at least one wireless device based on the notification.

A fifth aspect of the invention provides a data processing system for managing a plurality of wireless devices, comprising: a processing unit; a bus coupled to the processing unit; and a memory medium coupled to the bus comprising program code, which when executed by the processing unit causes the data processing system to: receive a notification for one of the plurality of wireless devices, the notification indicating at least one of: an access attempt threshold is exceeded or the wireless device is displaced; and remotely lock the wireless device based on the notification.

A sixth aspect of the invention provides computer software embodied in at least one propagated signal for managing a plurality of wireless devices, the at least one propagated signal comprising instructions for causing at least computer system to: receive a notification for one of the plurality of wireless devices, the notification indicating at least one of: an access attempt threshold is exceeded or the one wireless device is displaced; and remotely lock the wireless device based on the notification.

A seventh aspect of the invention provides a business method for managing a plurality of wireless devices, the business method comprising: managing a computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for services for managing wireless devices that uses access control. In an embodiment of the invention, the computerized method for managing wireless devices includes receiving a notification for at least one of the plurality of wireless devices that an access attempt threshold is exceeded or the at least one wireless device is displaced; and remotely locking the at least one wireless device based on the notification. As used herein, unless otherwise noted, the term "set" means one or more (i.e., at least one); the phrase "any solution" means any now known or later developed solution; and the phrase "wireless device" means any now known or later developed device that provides for communication via any wireless technology. The phrase "wireless device" means to include both an actual device and/or the hardware and/or the software used by the device using any now know or later developed technologies.

Figure 1:
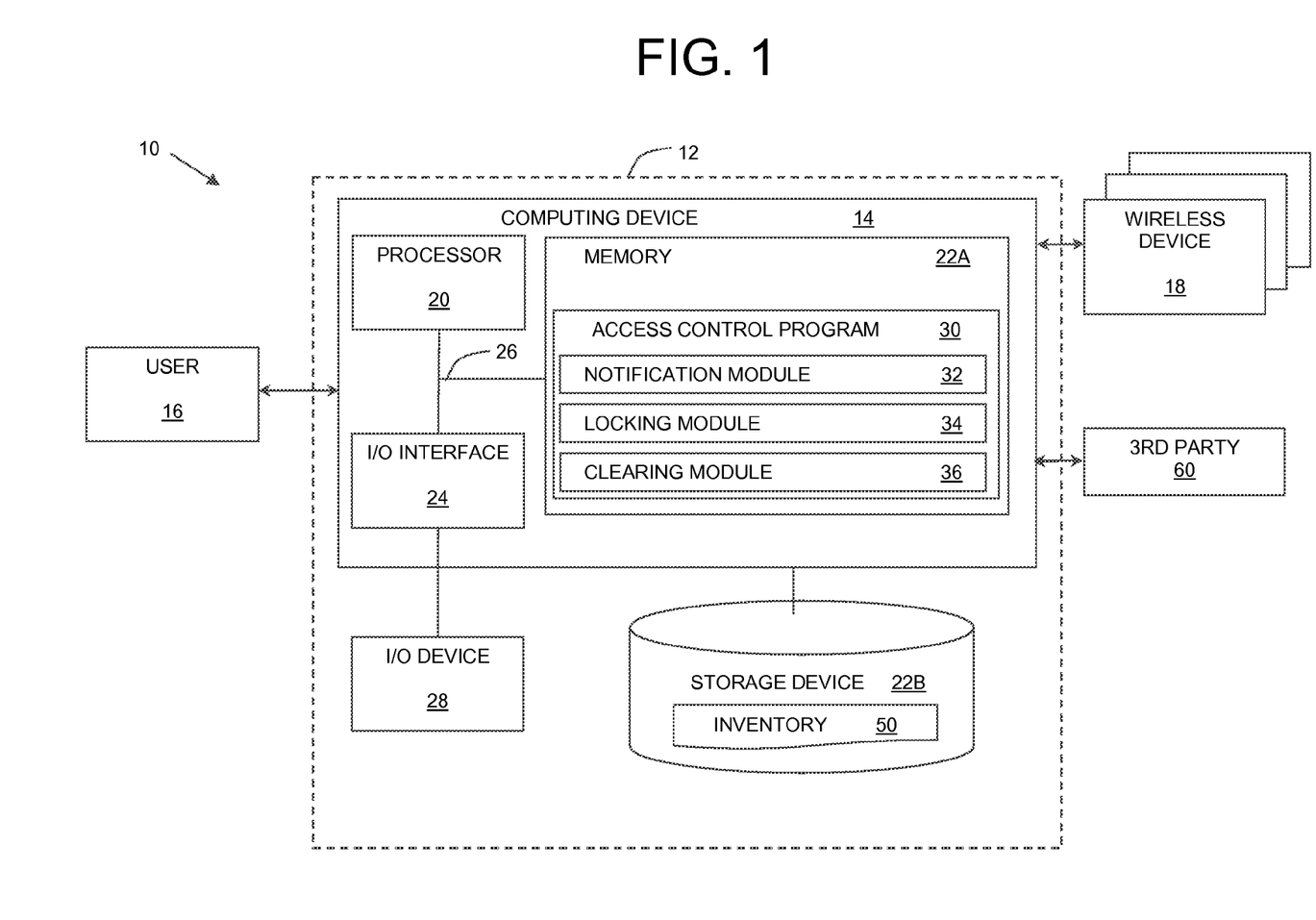
FIG. 1 shows an illustrative environment for managing wireless devices using access control according to an embodiment of the invention.

Turning to the drawings, FIG. 1 shows an illustrative environment 10 for managing wireless devices 18 that uses access control according to an embodiment of the invention. To this extent, environment 10 includes a computer system 12 that can perform the process described herein in order to manage wireless devices 18. In particular, computer system 12 is shown including a computing device 14 that comprises an access control program 30, which makes computing device 14 operable for managing wireless devices 18 using access control, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as access control program 30, which is stored in a storage system, such as memory 22A and/or storage device 22B. While executing program code, processor 20 can read and/or write data, such as inventory 50 to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user, such as a wireless device 18, to communicate with computing device 14 using any type of communications link.

In any event, computing device 14 can comprise any general purpose computing article of manufacture capable of executing program code installed thereon. However, it is understood that computing device 14 and access control program 30 are only representative of various possible equivalent computing devices that may perform the process described herein. To this extent, in other embodiments, the functionality provided by computing device 14 and access control program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, access control program 30 enables computer system 12 to manage a plurality of wireless devices 18 using access control. To this extent, access control program 30 is shown including a notification module 32, a locking module 34, and a clearing module 36. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Inventory 50 can comprise any type of electronic data. For example, inventory 50 can comprise a single data file that includes electronic data stored in any compressed or uncompressed format. However, it is understood that inventory 50 can be embodied in any number of data files and/or other storage solutions. Inventory 50 can be shared between peers and/or user 16 and/or a third party 60 using any solution. Third party 60 may be, for example, a customer, an administrator, a customer administrator, a service provider, an authority (i.e., local police, state police, federal authorities, and the like), and/or the like.

Figure 2:
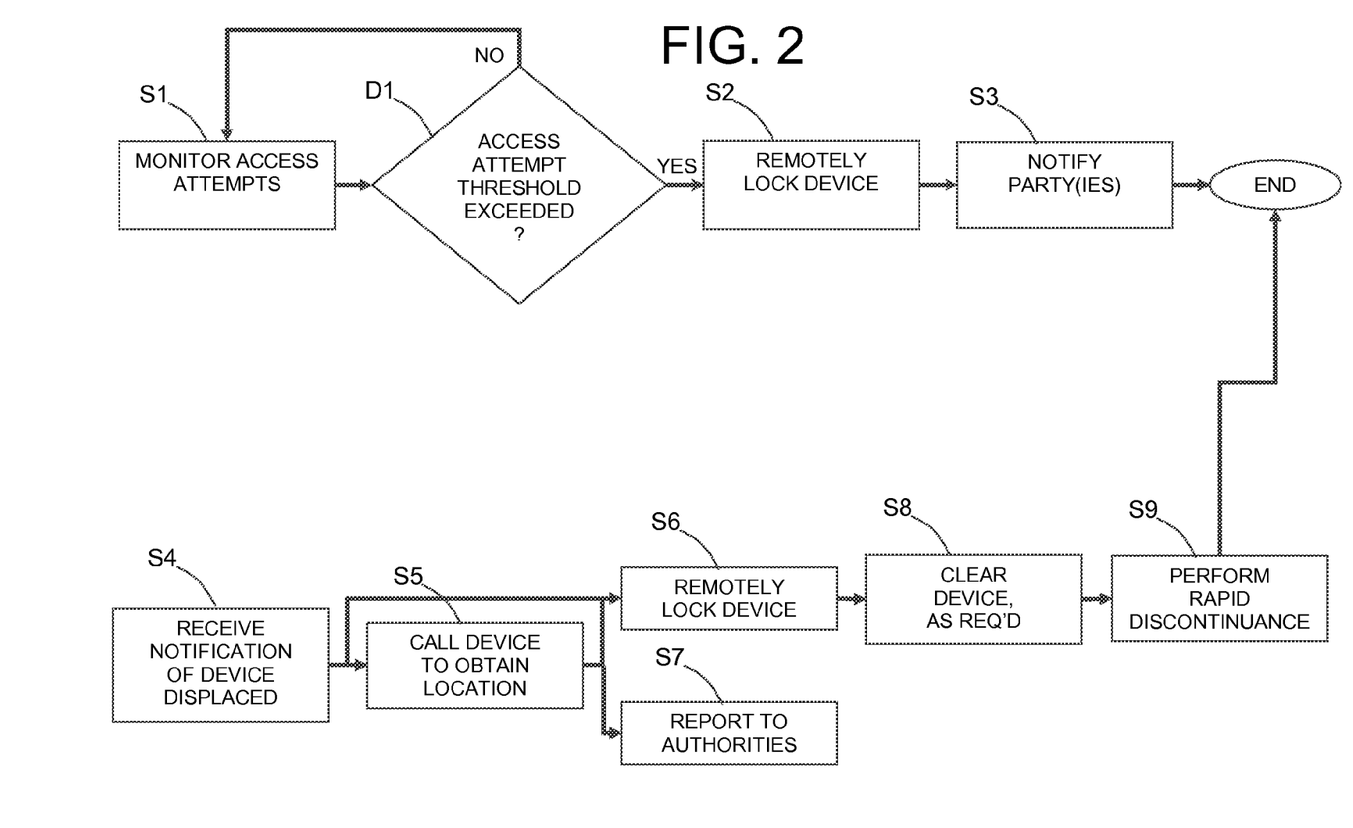
FIG. 2 shows an illustrative data flow for managing wireless devices of a customer using access control according to an embodiment of the invention.
Figure 3A:
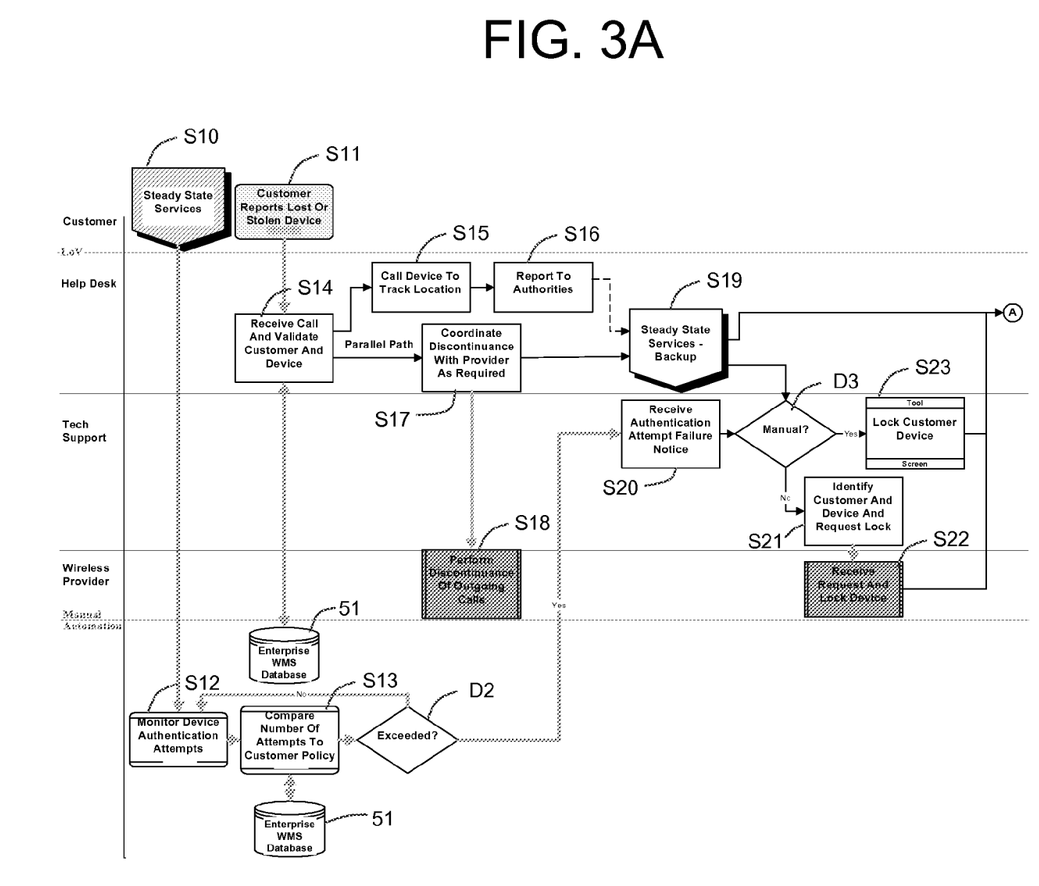
FIGS. 3A-3B show an illustrative data flow for managing wireless devices of a customer using access control according to another embodiment of the invention.
Figure 3B:
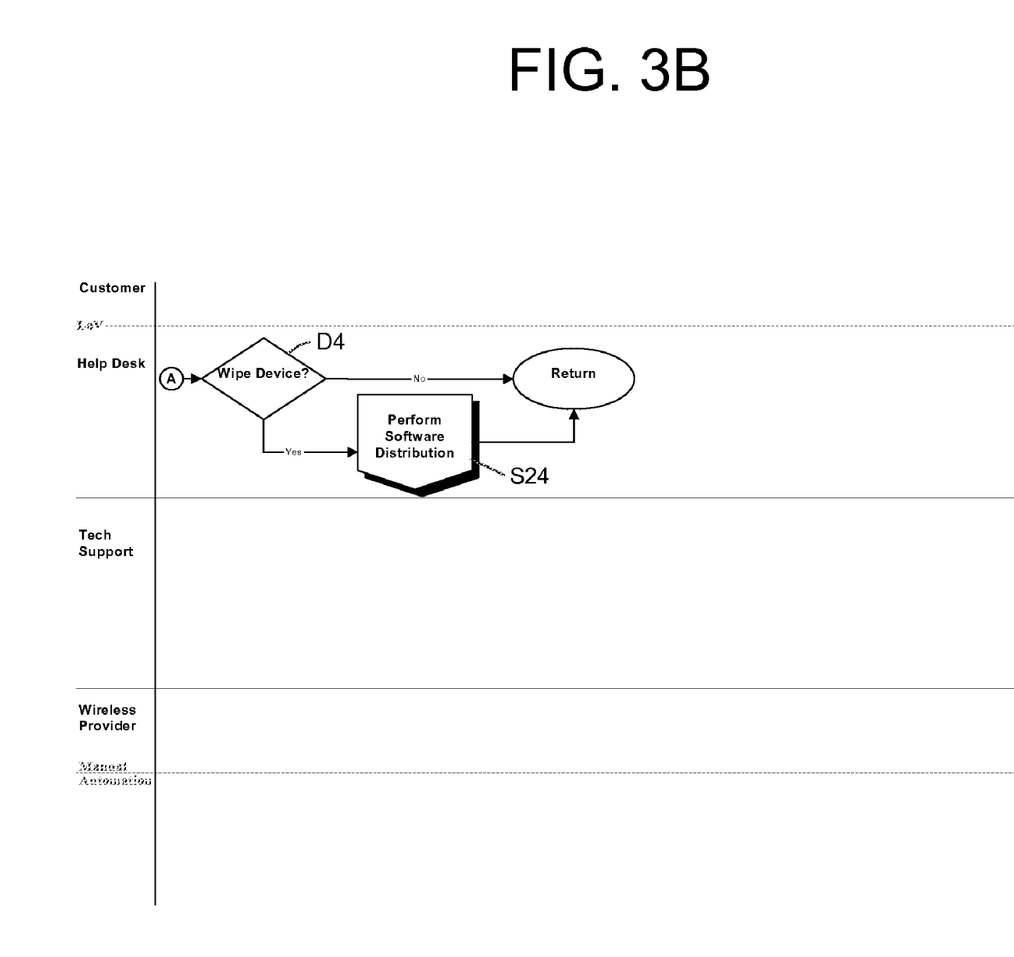

Aspects of the invention provide an improved solution for managing wireless devices 18 using access control. To this extent, FIGS. 2 and 3 show illustrative data flows or methods which can be implemented by access control program 30 (FIG. 1), according to embodiments of the invention. For example, a user (e.g., administrator, customer, corporation, company, partnership, group, organization, family, entity, etc.) 16 may desire to improve the overall management, control, and/or monitoring of a plurality of wireless devices 18 under its auspices. As such, under an embodiment of the invention, the method may be employed wherein S1 includes monitoring access attempts to at least one of the plurality of wireless devices 18 using notification module 32 (FIG. 1). In this manner, each wireless device 18 may have a fixed, or adjustable, access attempt threshold. The access attempt threshold may apply, for example, to general access to the entire wireless device 18 and/or access to a specific portion (e.g., address book, bank account number(s), etc.) of the wireless device 18. D1 follows wherein the access attempt threshold is checked to verify whether, or not, it has been exceeded by the access attempts made on the wireless device 18. In this manner, S1 and D1 collectively determine whether the access attempt threshold has been exceeded on a monitored wireless device 18. If the access attempt threshold is exceeded (YES at D1), then S2 follows. Conversely, if the access attempt threshold is not exceeded (NO at D1) then the method returns to S1 (i.e., continuing to monitor access attempts). For example, if a wireless device 18 is displaced (e.g., stolen, misplaced, etc.) and an impermissible user of the wireless device 18 attempts to access the wireless device 18 (e.g., entering a PIN number, entering a password, etc.) five (5) times, and the access attempt threshold is set at four (4), then the wireless device 18 is locked (S2) by locking module 34 (FIG. 1).

Once the wireless device 18 is remotely locked after the access attempt threshold is exceeded (S2), S3 follows wherein a notification is sent to at least one party. The party may be a third party 60 (FIG. 1) such as a customer, a customer administrator, a rightful owner/user of the wireless device 18, and/or the like. The notification may be by various means including electronic mail (e-mail), mail, telephonic, and/or the like. The notification may include various information and/or data related to, for example, the wireless device 18 (e.g., device type, serial number, user 16, etc.), the access attempt (e.g., how many attempts, time of attempts, what specifically was attempted to be accessed, etc.), the remote locking (e.g., time, location, etc.), and/or the like.

Another aspect of an embodiment of the method includes S4 wherein a user 16 is notified that at least one wireless device 18 is displaced by notification module 32 (FIG. 1). Displaced includes that the at least one wireless device 18 is lost, stolen, and/or the like. Upon receiving notification either S5 directly follows or S6 follows. In either event, S6 as with S2 discussed herein includes remotely locking the at least one wireless device 18 by locking module 34 (FIG. 1).

In an embodiment of the method that includes S5, the at least one wireless device 18 is called and/or contacted, thereby obtaining a physical location (e.g., approximate, exact) of the wireless device 18. In addition to S6 following S5, S7 also follows wherein the location is reported to a third party 60 (FIG. 1). The third party 60 may be an authority, a customer, a customer administrator, and/or the like. For example, the authority may be at least one of a local, regional and/or national police entity.

Following the remote locking of the wireless device 18 (S6) is S8 wherein the wireless device 18 is cleared, as required, by clearing module 36 (FIG. 1). The storage and/or memory of the wireless device 18 is cleared. The device 18 may be cleared based on a customer policy. For example, the customer, per the policy, may want a distinction between whether the wireless device 18 is lost or stolen. In the event the device 18 is lost, after the device 18 is remotely locked (S6), then the device 18 is not immediately cleared. Conversely, if the device 18 is stolen (e.g., out of the user's purse), then after remotely locking (S6) the device 18, the user would want the wireless device to be immediately cleared (S8). The customer policy may have a further feature wherein after an allotted time period (e.g., 10 days) the lost device 18 is finally cleared. In this manner, the customer policy would more readily address the not uncommon situation where the user loses, albeit temporarily, the wireless device 18, only to discover after searching that the device 18 was merely misplaced (e.g., lost in sofa). This would avoid prematurely clearing wireless device(s) 18 of all information. S9 follows wherein any service(s) for the wireless device 18 is discontinued. Thus, S8 and S9 collectively render the wireless device 18 virtually unusable.

Further, the method may additionally comprise updating the inventory 50. The updating can comprise storing and/or updating any information obtained from the process discussed herein. For example, the results of any one of, or combination of, S1-S9 and/or D1 may be stored and/or updated in inventory 50. Any combination of the two methods discussed herein may be stored and/or updated in inventory 50.

An alternative embodiment of a method for managing wireless devices 18 using access control is shown as an illustrative data flow in FIGS. 3A-3B. The embodiment may include interaction between several parties including a Customer (e.g., wireless device 18 user), a Service Provider for providing aspects of the method discussed herein and may include, for example, a Help Desk and Technical Support, and a wireless device 18 service provider (e.g., "Wireless Provider"). The functions provided by service provider can be implemented using computer system 12 (FIG. 1), and/or the like. In any event, the method starts with S10, wherein a Steady State Services—Help Desk subprocess is provided that may invoke the subprocess as a means to request the securing of wireless devices 18 based on authentication attempts as one of the plurality of service options provided by the service provider for the customer with a plurality of wireless devices 18.

One aspect of the Steady State Services subprocess (S10) is S12, wherein a tool on the wireless device 18 monitors each attempt at accessing the wireless device 18. In this manner, S13 follows and includes the tool comparing access attempts of the wireless device 18 to a predefined number of logon attempts permitted based on customer policy. At D2, the tool determines if the attempts have exceeded the established customer policy. In the event that the threshold as been reached (i.e., YES at D2), the method proceeds to S20. If the threshold has not reached (i.e., NO at D2), the method returns to S12 (i.e., continuing monitoring).

Alternatively, if a customer wireless device 18 is either lost or has been stolen, the customer at S11 makes a request of the service provider to secure the wireless device 18. The method proceeds to S14 wherein the Help Desk receives the customer's call and validates the customer and/or wireless device 18 information. Then performed typically in parallel, S15 and S17 are done. S15 includes a Help Desk agent calls the wireless device 18 thereby tracking the device 18 (e.g., obtaining a location). S16 includes the Help Desk agent contacting appropriate authorities and providing relevant information (e.g., location, etc.) about the wireless device 18.

Also following S14 is S17 wherein the Help Desk agent contact the wireless provider and provides relevant information and request service to the wireless device 18 be discontinued. In S18, the wireless provider takes necessary action to discontinue the wireless device's 18 ability to perform outgoing calls.

In either event, following S16 and S17 is S19, wherein a steady state service backup subprocess is invoked to back up customer data from the wireless device 18. Customer data may be stored, for example, in inventory 50 (FIG. 1) (e.g., Enterprise WMS Database 51). The process proceeds to two decisions, D3 and D4. At D4, Tech Support determines if the data on the wireless device 18 needs to be removed (e.g., "wiped"). If yes, then S24 follows wherein Tech Support performs a software distribution subprocess that addresses the need to wipe the wireless device 18. Subsequent to S24 or if D4 is "no" (i.e., the wireless device 18 does not need to be "wiped"), the method returns as required to the Steady State Services subprocess (S10).

Returning to D3 which follows both S20 and S19 in the method, a decision by, for example, Tech Support is made as to whether or not the service provider can lock the wireless device 18 or if the wireless provider must lock the device 18. If the wireless device 18 may be locked by the service provider (i.e., "yes" at D3), then the Service Provider (e.g., Tech Support) executes the tool which locks the customer's wireless device 18 (S23). When the locking is completed, the method continues at D4 as discussed herein. Contrastingly, if the wireless device 18 cannot be locked by the service provider and requires the wireless provider to lock the device 18 (i.e., "no" at D3), then S21 follows wherein Tech Support coordinates the lock with the wireless provider including identifying the customer, wireless device 18, and requesting the lock to the wireless provider. In such a case, S22 follows wherein the wireless provider receives the lock request and takes necessary action to lock the wireless device 18. As with the case of the service provider locking the device 18 (i.e., S23), following S22 is D4 as discussed herein.

As shown in FIG. 3A, various aspects of the method may be stored and/or updated in an inventory such as Enterprise WMS Database 51, including at S13 and S14. In any event, Enterprise WMS Database 51 may be employed to provide a historical record of activities conducted under various embodiments of the method discussed herein.

While shown and described herein as a method and system for managing wireless devices 18 using access control, it is understood that the invention further provides various alternative embodiments. For example, in one embodiment, aspects of the invention may include a method, system, and/or computer program product that entails managing wireless devices, wherein at least one of the existing wireless devices 18 are provided by a multitude of wireless device providers (FIG. 3). For example, certain economies of scale are obtained under aspects of the present invention, in particular, when a customer is a large entity (e.g., international corporation, multi-division company, etc.) which has, literally, hundreds, if not thousands, of existing wireless devices 18; perhaps, thousands of employees; and/or thousands of positions within the entity. Employees, positions, wireless providers, and/or wireless devices 18 are constantly shifting. Further, aspects of the invention particularly address scenarios when new wireless devices 18 and items related thereto, such as invoices, service plans, etc. are all provided by multiple wireless device providers from, perhaps, locations all over the world to the customer. This scenario quickly becomes exceedingly cumbersome and confusing. The invention allows for the controlled, systematic, and orderly management of the wireless devices 18.

In another embodiment, the invention provides a computer program stored on a computer-readable medium, which when executed, enables a computer system to manage wireless devices 18 using access control. To this extent, the computer-readable medium includes program code, such as access control program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing wireless devices 18 using access control. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages wireless devices 18 using access control, which enables users to perform the process described herein on a subscription, advertising, and/or fee basis. That is, a service provider could offer to manage a network and/or a computer system 12 (FIG. 1) that allows users to manage wireless devices 18 using access control as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computerized method of managing a plurality of wireless devices, the method comprising:
   receiving a notification for one of the plurality of wireless devices at a computer system, wherein the receiving includes at least one of: receiving the notification from the one of the plurality of wireless devices in response to an access attempt threshold being exceeded or receiving the notification from a party affiliated with the one of the plurality of wireless devices when the wireless device is displaced, wherein the access attempt threshold corresponds to a number of unsuccessful attempts to access the one of the plurality of wireless devices;
   calling the one of the plurality of wireless devices in response to the notification;
   obtaining, based on the calling, a location of the one of the plurality of wireless devices on the computer system;
   sending the location from the computer system for use by a user remote from the computer system;
   remotely locking the wireless device in response to the notification; and
   in response to receiving the notification that the access attempt threshold is exceeded, automatically remotely clearing the at least one wireless device of data on at least one of: storage or memory, and, in response to receiving the notification that the wireless device is displaced, automatically remotely clearing the at least one wireless device of data on at least one of: storage or memory after a predetermined time period.

2. The method of claim 1, further comprising sending a notification of the locking to at least one of: a customer or an administrator.

3. The method of claim 2, wherein the sending of the notification is via electronic mail.

4. The method of claim 1, further comprising monitoring access attempts to each of the plurality of wireless devices.

5. The method of claim 1, further comprising individually setting the access attempt threshold for each of the plurality of wireless devices.

6. The method of claim 1, wherein displaced includes at least one of: lost or stolen.

7. The method of claim 1, further comprising discontinuing at least one service to the wireless device in response to the notification.

8. The method of claim 1, wherein the user includes at least one law enforcement authority.

9. A computerized system, comprising:
   at least one computing device for managing a plurality of wireless device by performing a method including:
   for receiving a notification for one of the plurality of wireless devices, wherein the receiving includes at least one of: receiving the notification from the one of the plurality of wireless devices in response to an access attempt threshold being exceeded or receiving the notification from a party affiliated with the one of the plurality of wireless devices when the wireless device is displaced, wherein the access attempt threshold corresponds to a number of unsuccessful attempts to access the one of the plurality of wireless devices;
   calling the one of the plurality of wireless devices in response to the notification;
   obtaining, based on the calling, a location of the one of the plurality of wireless devices;
   sending the location for use by a user;
   remotely locking the wireless device in response to the notification; and
   in response to receiving the notification that the access attempt threshold is exceed, automatically remotely clearing the at least one wireless device of data on at least one of: storage or memory, and, in response to receiving the notification that the wireless device is displaced, automatically remotely clearing the at least one wireless device of data on at least one of: storage or memory after a predetermined time period.

10. The system of claim 9, the method further comprising sending a notification of the locking at least one of: a customer or an administrator.

11. The system of claim 10, wherein the sending the notification uses electronic mail.

12. The system of claim 9, the method further comprising monitoring access attempts to each of the plurality of wireless devices.

13. The system of claim 9, the method further comprising individually setting the access attempt threshold for each of the plurality of wireless devices.

14. The system of claim 9, wherein displaced includes at least one of: lost or stolen.

15. The system of claim 9, the method further comprising discontinuing at least one service to the wireless device in response to the notification.

16. The system of claim 9, wherein the user includes at least one law enforcement authority.

17. A computer program comprising program code stored on a non-transitory computer-readable medium, which when executed, enables a computer system to implement a method of managing a plurality of wireless devices, the method comprising:
   receiving a notification for one of the plurality of wireless devices, wherein the receiving includes at least one of: receiving the notification from the one of the plurality of wireless devices in response to an access attempt threshold being exceeded or receiving the notification from a party affiliated with the one of the plurality of wireless devices when the wireless device is displaced, wherein the access attempt threshold corresponds to a number of unsuccessful attempts to access the one of the plurality of wireless devices;
   calling the one of the plurality of wireless devices in response to the notification;
   obtaining, based on the calling, a location of the one of the plurality of wireless devices;
   sending the location for use by a user;
   remotely locking the wireless device in response to the notification; and
   in response to receiving the notification that the access attempt threshold is exceeded, automatically remotely clearing the at least one wireless device of data on at least one of: storage or memory, and, in response to receiving the notification that the wireless device is displaced, automatically remotely clearing the at least one wireless device of data on at least one of: storage or memory after a predetermined time period.

18. A method of generating a system for managing a plurality of wireless devices, the method comprising:
   providing a computer system operable to:
   receive a notification for one of the plurality of wireless devices, wherein the receiving includes at least one of: receiving the notification from the one of the plurality of wireless devices in response to an access attempt threshold being exceeded or receiving the notification from a party affiliated with the one of the plurality of wireless devices when the wireless device is displaced, wherein the access attempt threshold corresponds to a number of unsuccessful attempts to access the one of the plurality of wireless devices;

call the one of the plurality of wireless devices in response to the notification;

obtain, based on the calling, a location of the one of the plurality of wireless devices;

send the location for use by a user;

remotely lock the wireless device in response to the notification; and in response to receiving the notification that the access attempt threshold is exceeded, automatically remotely clear the at least one wireless device of data on at least one of: storage or memory, and, in response to receiving the notification that the wireless device is displaced, automatically remotely clear the at least one wireless device of data on at least one of: storage or memory after a predetermined time period.

\* \* \* \* \*